United States Patent
Hotta et al.

(10) Patent No.: US 10,067,016 B2
(45) Date of Patent: Sep. 4, 2018

(54) TORQUE DETECTING APPARATUS AND METHOD FOR MANUFACTURING THE SAME

(71) Applicant: JTEKT CORPORATION, Osaka-shi, Osaka (JP)

(72) Inventors: Kensaku Hotta, Kashihara (JP); Noriaki Matsui, Kashihara (JP); Akihiro Takeuchi, Takahama (JP); Hiroshi Kutsumi, Takarazuka (JP); Takahiro Yukimura, Kashiba (JP); Shoichi Koyama, Yamatotakada (JP); Satoshi Haraguchi, Kyoto (JP); Toshihiro Moriuchi, Kawachinagano (JP); Yuuki Kosumi, Kashiba (JP); Masafumi Kajitani, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/810,508

(22) Filed: Nov. 13, 2017

(65) Prior Publication Data

US 2018/0143092 A1    May 24, 2018

(30) Foreign Application Priority Data

Nov. 21, 2016  (JP) .................................. 2016-226315

(51) Int. Cl.
    *G01L 3/10*    (2006.01)
(52) U.S. Cl.
    CPC .................................... *G01L 3/101* (2013.01)
(58) Field of Classification Search
    CPC ...................................................... G01L 3/101

USPC ...................... 73/862.331–862.338, 862.325
    See application file for complete search history.

(56) References Cited

U.S. PATENT DOCUMENTS

| | | | | |
|---|---|---|---|---|
| 9,341,528 B2* | 5/2016 | Yukimura | ............... | G01L 3/104 |
| 9,772,239 B2* | 9/2017 | Matsui | ..................... | B62D 6/10 |
| 2007/0186694 A1* | 8/2007 | Tokumoto | ............... | G01L 3/104 |
| | | | | 73/862.331 |
| 2015/0033877 A1 | 2/2015 | Hotta et al. | | |

FOREIGN PATENT DOCUMENTS

| JP | 2014-059179 A | 4/2014 |
|---|---|---|
| JP | 2015-031600 A | 2/2015 |

OTHER PUBLICATIONS

Apr. 24, 2018 Search Report issued in European Patent Application No. 17201998.6.

* cited by examiner

*Primary Examiner* — Jonathan Dunlap
*Assistant Examiner* — Octavia Hollington
(74) *Attorney, Agent, or Firm* — Oliff PLC (57) ABSTRACT

A torque detecting apparatus includes an annular magnetic flux collecting ring, a magnetic flux collecting holder surrounding and holding the magnetic flux collecting ring, and a magnetic shield including a circumferential end and attached to the outer periphery of the magnetic flux collecting holder. The magnetic flux collecting holder includes a housing portion that houses in its inner space the circumferential end of the magnetic shield. The housing portion includes an outer wall radially inwardly facing an outer peripheral surface of the circumferential end of the magnetic shield such that a first clearance is provided between the housing portion and the outer peripheral surface of the circumferential end of the magnetic shield.

8 Claims, 9 Drawing Sheets

TORQUE DETECTING APPARATUS AND METHOD FOR MANUFACTURING THE SAME

INCORPORATION BY REFERENCE

The disclosure of Japanese Patent Application No. 2016-226315 filed on Nov. 21, 2016, including the specification, drawings and abstract, is incorporated herein by reference in its entirety.

BACKGROUND OF THE INVENTION

1. Field of the Invention

The invention relates to torque detecting apparatuses and methods for manufacturing torque detecting apparatuses.

2. Description of the Related Art

A torque detecting apparatus to detect a relative rotational displacement amount between shafts axially coupled to each other is known in the related art. A torque detecting apparatus disclosed in Japanese Patent Application Publication No. 2015-031600 (JP 2015-031600 A) includes a cylindrical magnetic flux collecting holder, a magnetic shield, and a housing. The magnetic flux collecting holder is integral with a magnetic flux collecting ring. The magnetic shield is attached to the outer peripheral surface of the magnetic flux collecting holder so as to reduce influence that an external magnetic field exerts on the magnetic flux collecting ring. The housing is integral with the magnetic flux collecting holder.

A change in temperature causes the magnetic shield, the magnetic flux collecting holder, and the housing to expand or contract. The magnetic shield, the magnetic flux collecting holder, and the housing expand or contract to different degrees as a result of a change in temperature. Thus, a change in temperature causes the magnetic shield to be pressed against the magnetic flux collecting holder and/or the housing. Circumferential ends of the magnetic shield, in particular, expand or contract to a large degree owing to a change in temperature. This concentrates stress on portions of the magnetic flux collecting holder and/or the housing that are in contact with the circumferential ends. Such stress concentration may unfortunately form cracks in these portions.

SUMMARY OF THE INVENTION

An object of the invention is to provide a torque detecting apparatus that prevents formation of cracks in components surrounding a magnetic shield caused by contact of circumferential ends of the magnetic shield with the surrounding components, and a method for manufacturing such a torque detecting apparatus.

A torque detecting apparatus according to an aspect of the invention includes an annular magnetic flux collecting ring, a magnetic flux collecting holder, and a magnetic shield. The magnetic flux collecting holder surrounds and holds the magnetic flux collecting ring. The magnetic shield is attached to an outer periphery of the magnetic flux collecting holder. The magnetic shield includes a circumferential end. The magnetic flux collecting holder includes a housing portion housing the circumferential end of the magnetic shield. The housing portion includes an outer wall radially inwardly facing an outer peripheral surface of the circumferential end of the magnetic shield such that a clearance is provided between the housing portion and the outer peripheral surface of the circumferential end of the magnetic shield.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
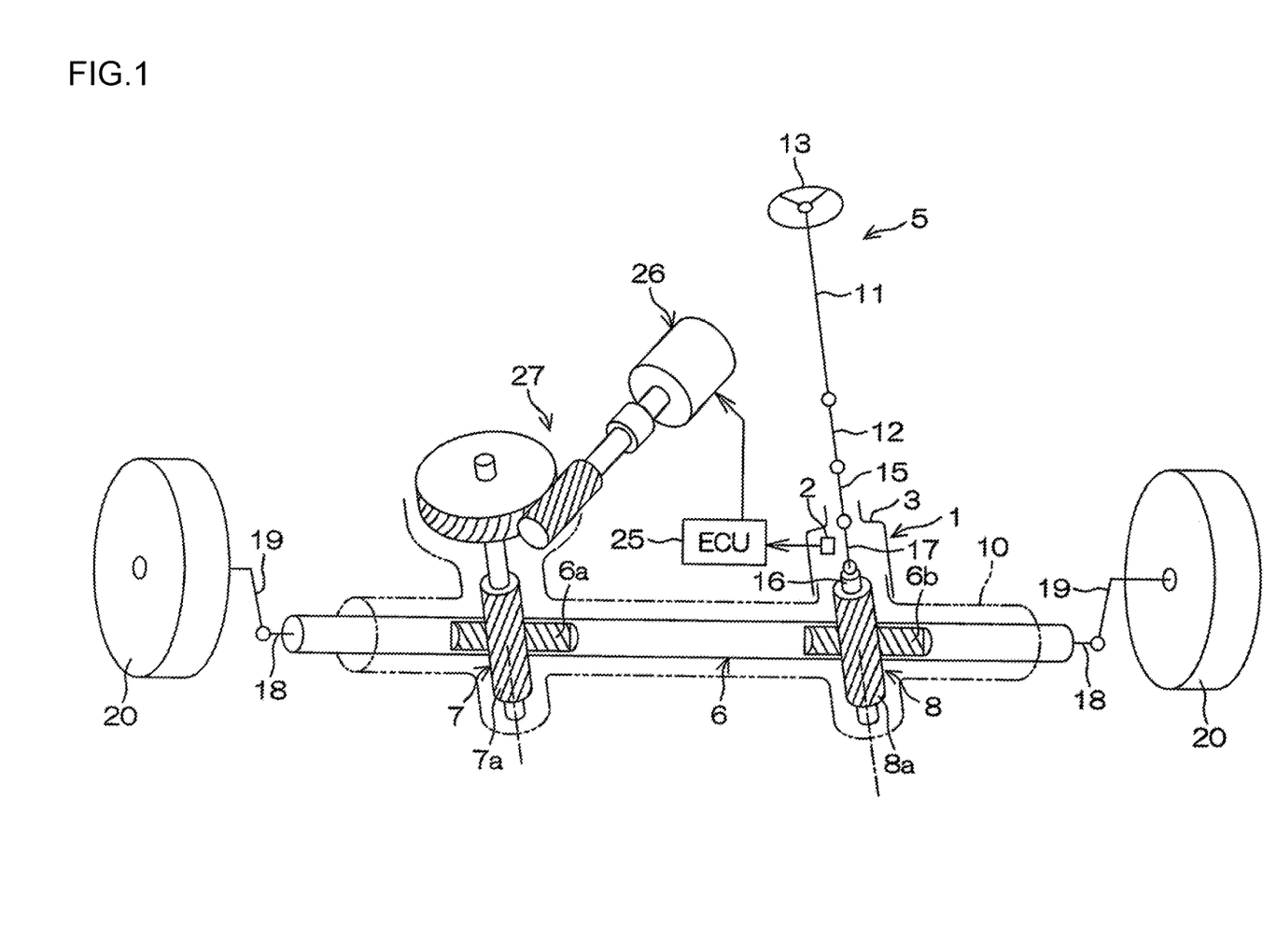
FIG. 1 is a diagram illustrating a schematic configuration of an electric power steering system including a torque detecting apparatus according to an embodiment of the invention.

An embodiment of the invention will be described in detail below with reference to the accompanying drawings. FIG. 1 is a diagram illustrating a schematic configuration of an electric power steering system 5 including a torque detecting apparatus 1 according to the embodiment of the invention. The torque detecting apparatus 1 includes a torque sensor 2 and a housing 3 that houses the torque sensor 2. The torque sensor 2 and the housing 3 are integral with each other. The electric power steering system 5 equipped with the torque sensor 2 is a dual pinion electric power steering system, for example. The electric power steering system 5 includes a rack shaft 6, a first pinion shaft 7, and a second pinion shaft 8. The first pinion shaft 7 is provided with a first pinion 7a that meshes with a first rack 6a of the rack shaft 6. Thus, the first pinion shaft 7 serves to transmit a steering assist force. The second pinion shaft 8 is provided with a second pinion 8a that meshes with a second rack 6b of the rack shaft 6. Thus, the second pinion shaft 8 serves to transmit a manual steering force.

The housing 3 is attached to, for example, a rack housing 10 that houses the rack shaft 6. The torque sensor 2 is attached to, for example, the second pinion shaft 8. The second pinion shaft 8 includes an input shaft 15, an output shaft 16, and a torsion bar 17. The input shaft 15 is coupled to a steering wheel 13 through a steering shaft 11 and an intermediate shaft 12. The output shaft 16 is provided with the second pinion 8a. The torsion bar 17 is coaxially coupled to the input shaft 15 and the output shaft 16. The input shaft 15 and the output shaft 16 are rotatable relative to each other within a predetermined angular range.

Steered wheels 20 are each coupled to an associated one of the ends of the rack shaft 6 through an associated tie rod 18 and an associated steering knuckle arm 19. A driver manipulates the steering wheel 13 so as to steer the steered wheels 20 through the steering shaft 11, the intermediate shaft 12, the second pinion shaft 8, the rack shaft 6, the tie rods 18, and the steering knuckle arms 19. When the driver manipulates the steering wheel 13 in order to steer the steered wheels 20, the input shaft 15 and the output shaft 16 of the second pinion shaft 8 rotate relative to each other so as to twist the torsion bar 17.

The torque sensor 2 detects the amount of twist of the torsion bar 17 of the second pinion shaft 8. A torque detection signal from the torque sensor 2 is provided to an electronic control unit (ECU) 25. The ECU 25 drives and controls, through an internal driving circuit, an electric motor 26 in accordance with, for example, the torque detection signal and/or a vehicle speed detection signal provided from a vehicle speed sensor (not illustrated). Rotation of the electric motor 26 is reduced in speed through a speed reducing mechanism 27. The resulting rotation is transmitted to the first pinion shaft 7 and converted into a linear motion of the rack shaft 6. This linear motion assists the driver in steering a vehicle.

Figure 2:
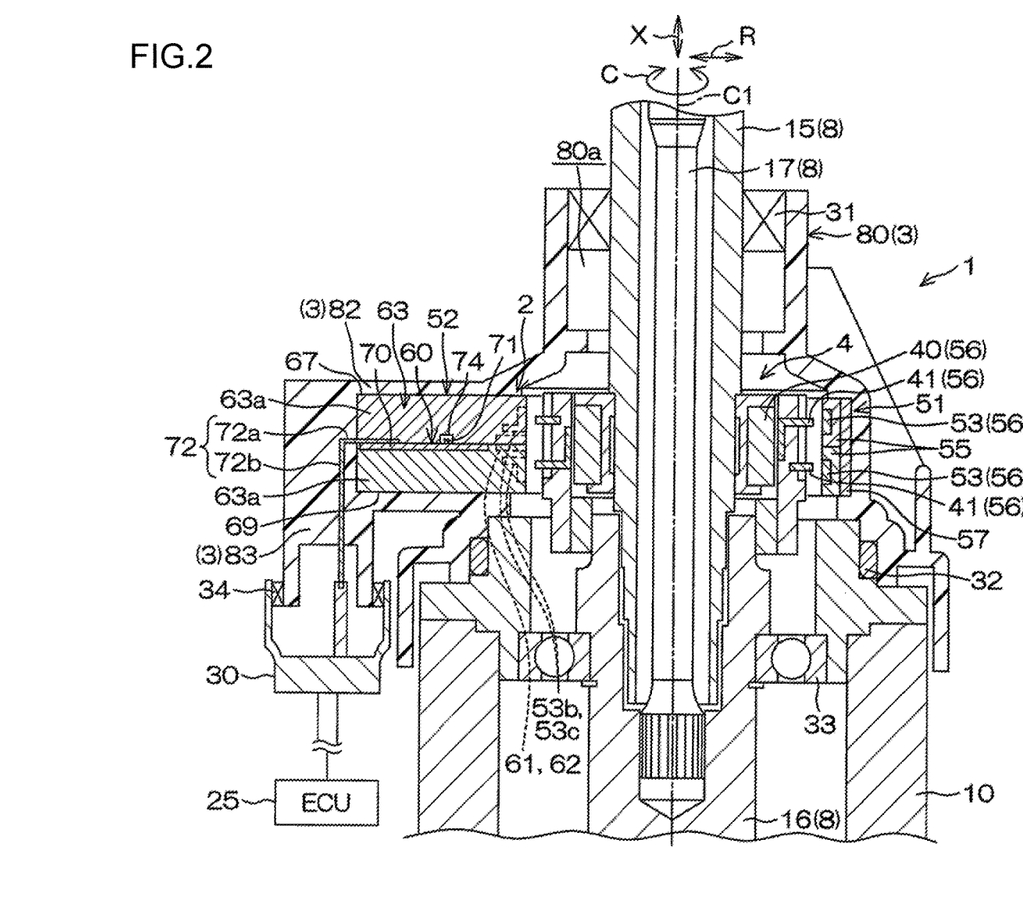
FIG. 2 is a schematic cross-sectional view of the torque detecting apparatus and components adjacent thereto.
Figure 3:
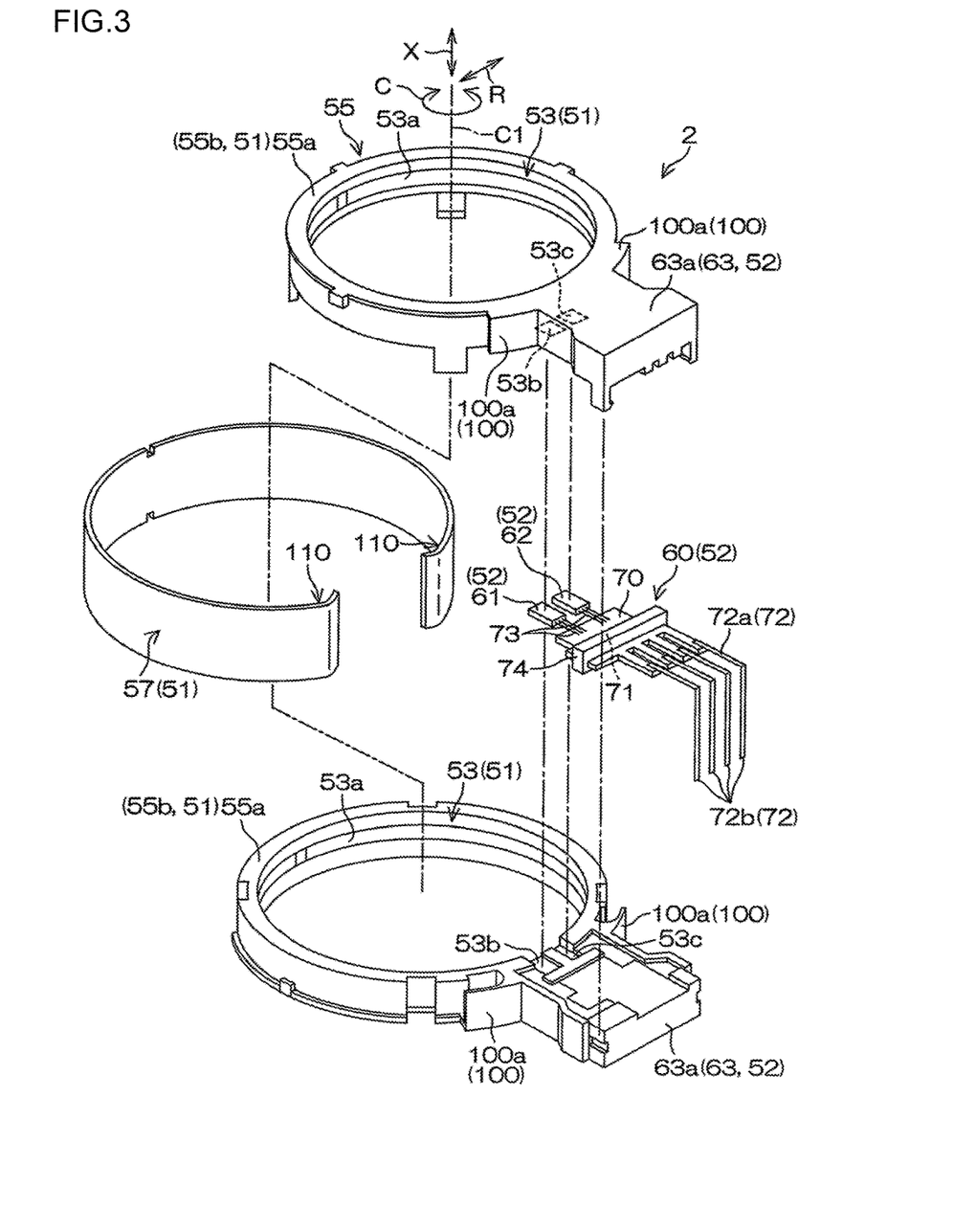
FIG. 3 is an exploded perspective view of a torque sensor.
Figure 4:
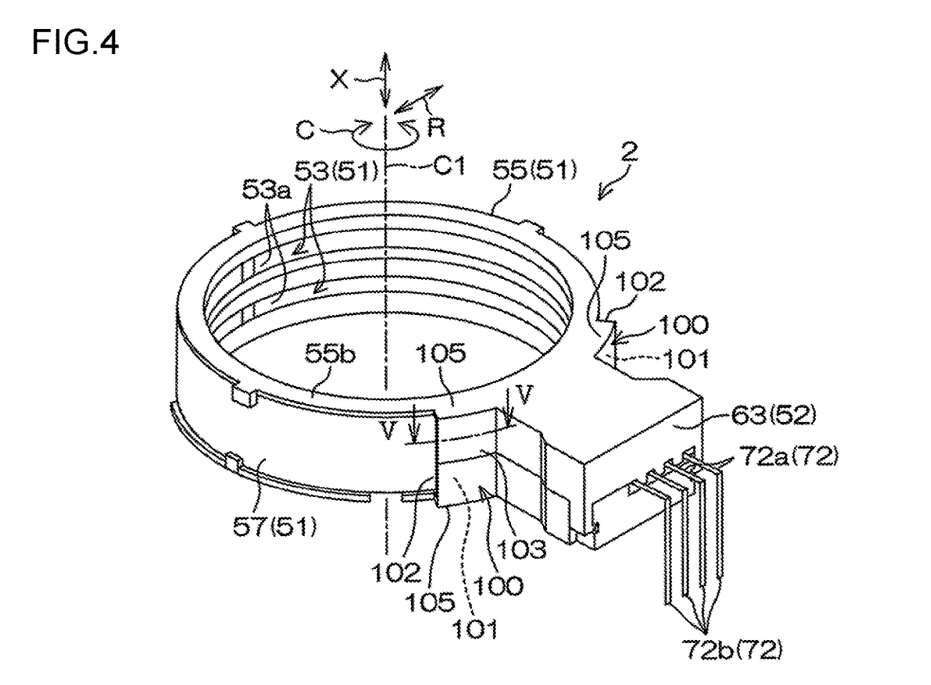
FIG. 4 is a perspective view of the torque sensor.

The configuration of the torque detecting apparatus 1 will be described in detail below. FIG. 2 is a schematic cross-sectional view of the torque detecting apparatus 1 and components adjacent thereto. FIG. 3 is an exploded perspective view of the torque sensor 2. FIG. 4 is a perspective view of the torque sensor 2. The torque sensor 2 includes a permanent magnet 40 and a pair of magnetic yokes 41 magnetically connected to the permanent magnet 40. The permanent magnet 40 is secured to the input shaft 15 such that the permanent magnet 40 is concentric with and rotatable together with the input shaft 15. The pair of magnetic yokes 41 are secured to the output shaft 16 such that the magnetic yokes 41 are concentric with and rotatable together with the output shaft 16. The input shaft 15 and the output shaft 16 rotate relative to each other so as to change the positions of the pair of magnetic yokes 41 and the permanent magnet 40 relative to each other. This results in a change in magnetic flux.

The torque sensor 2 is electrically connected to the ECU 25. The torque sensor 2 detects magnetic flux from the magnetic yokes 41. The torque sensor 2 includes a first circuit portion 51 having an annular shape. The first circuit portion 51 includes a central axis C1 corresponding to the central axis of the input shaft 15. A radial direction defined with respect to the central axis C1 will be referred to as a "radial direction R". The radial direction R includes a radially inward direction and a radially outward direction. The radially inward direction is a direction toward the central axis C1. The radially outward direction is a direction away from the central axis C1. A direction extending along the central axis C1 will be referred to as an "axial direction X". A direction extending around the central axis C1 will be referred to as a "circumferential direction C".

The first circuit portion 51 includes a pair of annular magnetic flux collecting rings 53 and an annular magnetic flux collecting holder 55. The pair of magnetic flux collecting rings 53 are each magnetically connected to an associated one of the magnetic yokes 41. The magnetic flux collecting holder 55 surrounds and holds the magnetic flux collecting rings 53. The torque sensor 2 further includes a second circuit portion 52 having a block shape. The second circuit portion 52 is protruded radially outward from the outer periphery of the first circuit portion 51. The second circuit portion 52 includes a first magnetic element 61, a second magnetic element 62, an electronic component 60, and a holder 63. The first magnetic element 61 and the second magnetic element 62 each output a signal responsive to magnetic flux flowing through a magnetic circuit 56. The electronic component 60 is electrically connected to a pair of the first and second magnetic elements 61 and 62. The holder 63 houses and holds the pair of first and second magnetic elements 61 and 62 and the electronic component 60.

Each of the first and second magnetic elements 61 and 62 is a Hall integrated circuit (IC), for example. In the cross-sectional view of FIG. 2, the pair of first and second magnetic elements 61 and 62 are actually invisible, but both of the pair of first and second magnetic elements 61 and 62 are indicated by dashed lines for convenience of description. The electronic component 60 includes a substrate 70 and a capacitor 71 mounted on the substrate 70. The substrate 70 is electrically connected with metal terminals 72. The terminals 72 each include: a first portion 72a coupled to the substrate 70; and a second portion 72b extending downward from an end of the first portion 72a. The electronic component 60 further includes: pins 73 that couple the pair of first and second magnetic elements 61 and 62 to the substrate 70; and a cover 74 covering the capacitor 71.

The holder 63 is made of resin. The holder 63 has a block shape (i.e., a substantially rectangular cuboid shape). The holder 63 includes a pair of sub-holders 63a fitted to each other, with the electronic component 60 sandwiched therebetween. The housing 3 includes a tubular body 80, a holder retainer 82, and a connector portion 83. The body 80, the holder retainer 82, and the connector portion 83 are made of a single material and integral with each other. The body 80 surrounds the input shaft 15 of the second pinion shaft 8. The body 80 includes an inner space 80a. The pair of magnetic flux collecting rings 53 and the magnetic flux collecting holder 55 are housed in the inner space 80a. The holder retainer 82 is protruded from the outer peripheral surface of the body 80. The holder retainer 82 retains the holder 63. The connector portion 83 is extended from a protruded end of the holder retainer 82. A waterproof connector 30 is fitted to the connector portion 83. Connecting the connector 30 to the connector portion 83 electrically connects the second portions 72b of the terminals 72 to the ECU 25.

The housing 3 is waterproofed with a seal member 31, a seal member 32, a bearing 33, and a seal member 34 so as to prevent entry of liquid into the housing 3. The seal member 31 is provided between the body 80 and the input shaft 15. The seal member 32 is provided between the body 80 and the rack housing 10. The bearing 33 is provided between the rack housing 10 and the output shaft 16. The seal member 34 is provided between the connector 30 and the connector portion 83.

The magnetic flux collecting holder 55 is made of resin. The magnetic flux collecting holder 55 is housed in the housing 3 made of resin. The magnetic flux collecting holder 55 is integral with the housing 3. The magnetic flux collecting holder 55 includes an annular portion 55b. The annular portion 55b includes a pair of sub-portions 55a fitted to each other in the axial direction X. Each of the sub-portions 55a is integral with an associated one of the sub-holders 63a of the holder 63. Each of the magnetic flux collecting rings 53 includes an annular portion 53a, a first element facing portion 53b, and a second element facing portion 53c. The first element facing portion 53b is protruded radially outward from the annular portion 53a and faces the first magnetic element 61. The second element facing facing portion 53c is protruded radially outward from the annular portion 53a and faces the second magnetic element 62.

Each of the magnetic flux collecting rings 53 is molded with the resin of an associated one of the sub-portions 55a such that each of the magnetic flux collecting rings 53 is integral with the associated sub-portion 55a of the magnetic flux collecting holder 55. Thus, each of the magnetic flux collecting rings 53 and the associated sub-portion 55a are formed into an annular shape as a whole. In other words, the magnetic flux collecting rings 53 are each held by an associated one of the sub-portions 55a. Each of the sub-portions 55a of the magnetic flux collecting holder 55 and each of the magnetic flux collecting rings 53 surround the outer periphery of an associated one of the magnetic yokes 41 in a concentric and noncontact manner. The first magnetic element 61 is disposed between the first element facing portions 53b of the pair of magnetic flux collecting rings 53. The second magnetic element 62 is disposed between the second element facing portions 53c of the pair of magnetic flux collecting rings 53. Magnetic flux that has changed in accordance with a change in the position of the permanent magnet 40 relative to each magnetic yoke 41 is guided to the pair of first and second magnetic elements 61 and 62 by the pair of magnetic flux collecting rings 53.

The first circuit portion 51 further includes a magnetic shield 57 to reduce influence exerted on the magnetic circuit 56 by an external magnetic field. The magnetic circuit 56 is provided by the magnetic flux collecting rings 53, the magnetic yokes 41, and the permanent magnet 40. The magnetic shield 57 is attached to the outer periphery of the magnetic flux collecting holder 55. Thus, the magnetic flux collecting holder 55 is disposed adjacent to the magnetic shield 57. The housing 3 housing the magnetic flux collecting holder 55 and integrally molded with the magnetic flux collecting holder 55 is disposed around the magnetic shield 57 attached to the outer periphery of the magnetic flux collecting holder 55.

The magnetic shield 57 is C-shaped by bending a metal plate. The magnetic shield 57 includes a pair of circumferential ends 110. The circumferential ends 110 of the magnetic shield 57 are ends of the magnetic shield 57 in the circumferential direction C. The circumferential ends 110 of the magnetic shield 57 are disposed on both sides of the second circuit portion 52. The magnetic flux collecting holder 55 further includes a pair of housing portions 100. The pair of housing portions 100 each house an associated one of the circumferential ends 110 of the magnetic shield 57. The pair of housing portions 100 are disposed on the outer periphery of the annular portion 55b, with an interval between the housing portions 100 in the circumferential direction C. The housing portions 100 are disposed on both sides of the second circuit portion 52. The magnetic flux collecting holder 55 is provided by integrally molding the pair of housing portions 100 with the annular portion 55b. Alternatively, the annular portion 55b and the pair of housing portions 100 may be molded separately. In such a case, the magnetic flux collecting holder 55 may be provided by assembling the separately molded annular portion 55b and housing portions 100 to each other.

Dividing the magnetic flux collecting holder 55 in a direction perpendicular to the axial direction X divides the pair of housing portions 100 in a direction perpendicular to the axial direction X. Thus, each of the housing portions 100 includes a pair of sub-portions 100a fitted to each other in the axial direction X such that an inner space 101 is defined. Each of the housing portions 100 includes the inner space 101, and an opening 102 through which the inner space 101 is in communication with the outside of the housing portion 100. The opening 102 is provided at an end of each housing portion 100 in the circumferential direction C.

Examples of metal used for the magnetic shield 57 include iron and magnetic stainless steel. Iron has a linear thermal expansion coefficient of $1.21 \times 10^{-5}/°$ C. Magnetic stainless steel has a linear thermal expansion coefficient of $1.02 \times 10^{-5}/°$ C. Examples of resin used for the magnetic flux collecting holder 55 and the housing 3 include PA6T/6I and PA612. PA6T/6I has a linear thermal expansion coefficient of $5.0 \times 10^{-5}/°$ C. PA612 has a linear thermal expansion coefficient of $8.0 \times 10^{-5}/°$ C.

Figure 5:
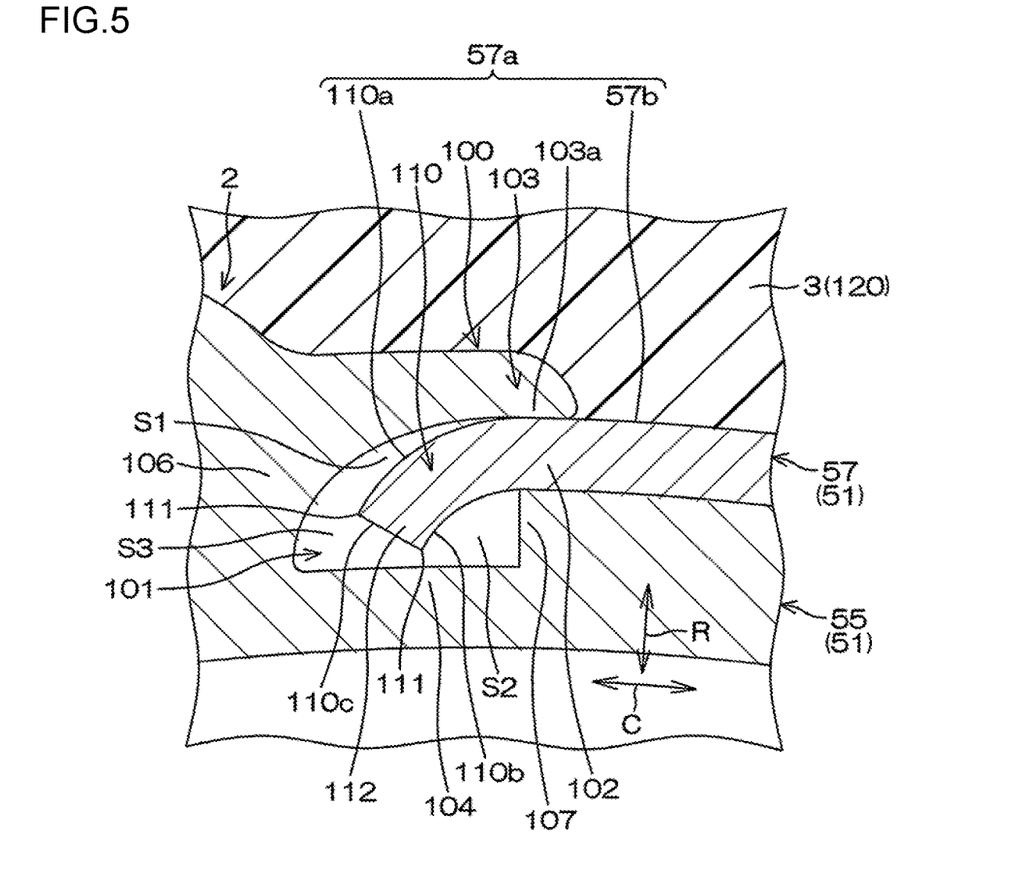
FIG. 5 is a schematic cross-sectional view of the torque sensor and a housing taken along the line V-V in FIG. 4.

The magnetic flux collecting holder 55 and the housing 3 made of resin each greatly differ in linear thermal expansion coefficient from the magnetic shield 57 made of metal. Thus, the degree of expansion or contraction of each of the magnetic flux collecting holder 55 and the housing 3 caused by a change in temperature greatly differs from the degree of expansion or contraction of the magnetic shield 57 caused by a change in temperature. FIG. 5 is a schematic cross-sectional view of the torque sensor 2 and the housing 3 taken along the line V-V in FIG. 4. Although the housing 3 is not illustrated in FIG. 4, the housing 3 is illustrated in FIG. 5 for convenience of description. Each housing portion 100 includes an outer wall 103, an inner wall 104, a pair of axial walls 105 (see FIG. 4), and a bottom wall 106. The outer wall 103 defines a radially outward portion of the inner space 101. The inner wall 104 defines a radially inward portion of the inner space 101. The pair of axial walls 105 define ends of the inner space 101 in the axial direction X. The bottom wall 106 defines a portion of the inner space 101 located opposite to the opening 102 in the circumferential direction C.

The outer wall 103 radially inwardly faces an outer peripheral surface 110a of the circumferential end 110 of the magnetic shield 57 such that a first clearance S1 is provided between the outer wall 103 and the outer peripheral surface 110a of the circumferential end 110. The inner wall 104 radially outwardly faces an inner peripheral surface 110b of the circumferential end 110 of the magnetic shield 57 such that a second clearance S2 is provided between the inner wall 104 and the inner peripheral surface 110b of the circumferential end 110. The bottom wall 106 located opposite to the opening 102 faces a circumferential end face 110c of the magnetic shield 57 in the circumferential direction C such that a third clearance S3 is provided between the bottom wall 106 and the circumferential end face 110c of the magnetic shield 57.

The opening 102 of each of the pair of housing portions 100 is provided at an end of the housing portion 100 located opposite to the second circuit portion 52 in the circumferential direction C (see FIG. 4). Each of the circumferential ends 110 of the magnetic shield 57 is inserted into the associated housing portion 100 in the circumferential direction C and thus housed in the associated housing portion 100. Resin 120 that forms the housing 3 is not present in the inner space 101 including the clearances S1 to S3. The outer wall 103 of each housing portion 100 includes a contact region 103a in contact with an outer peripheral surface 57a of the magnetic shield 57 at a location closer to the opening 102 of the housing portion 100 than to the associated circumferential end 110 (i.e., at a location away from the associated circumferential end 110 in the circumferential direction C). Specifically, the magnetic shield 57 is interposed between the inner wall 104 of each housing portion 100 and the contact region 103a of the associated outer wall 103 at a location closer to the opening 102 than to the first clearance S1. The outer peripheral surface 57a of the magnetic shield 57 includes: the outer peripheral surface 110a of each circumferential end 110 of the magnetic shield 57; and an outer peripheral surface 57b of a portion of the magnetic shield 57 other than the circumferential ends 110. This means that each contact region 103a is in contact with the outer peripheral surface 57b.

The inner wall 104 of each housing portion 100 is provided with a step 107 by which the inner wall 104 is recessed radially inward in a region of the housing portion 100 located between the opening 102 and the bottom wall 106. The housing 3 is radially inwardly in intimate contact with the outer wall 103 of each housing portion 100 and is radially inwardly in contact with a portion of the magnetic shield 57 other than the circumferential ends 110. Each circumferential end 110 of the magnetic shield 57 includes at its extremity a pair of corners 111. One of the pair of corners 111 is provided on a connection between the circumferential end face 110c of the magnetic shield 57 and the outer peripheral surface 110a of the associated circumferential end 110 of the magnetic shield 57. The other one of the pair of corners 111 is provided on a connection between the circumferential end face 110c of the magnetic shield 57 and the inner peripheral surface 110b of the associated circumferential end 110 of the magnetic shield 57. Each circumferential end 110 of the magnetic shield 57 includes a curved portion 112 radially inwardly curved such that each circumferential end face 110c faces the inner wall 104 of the associated housing portion 100.

A method for manufacturing the torque detecting apparatus 1 described above will be described in detail below. A first step involves preparation of the torque sensor 2 including the magnetic flux collecting holder 55 and the magnetic shield 57 attached to the outer periphery of the magnetic flux collecting holder 55, with the circumferential ends 110 of the magnetic shield 57 housed in the housing portions 100. As used herein, the term "preparation" refers to preparing component(s) and/or jig(s) to be used for manufacture of an apparatus. This means that the preparation does not necessarily involve manufacturing the component(s) and/or jig(s) by a manufacturer of the apparatus. In other words, preparing component(s) and/or jig(s) may involve commissioning other manufacturer(s) to manufacture component(s) and/or jig(s) to be used in manufacturing steps for an apparatus. In one example, the torque sensor 2 that is a component of the torque detecting apparatus 1 may be manufactured by a manufacturer of the torque detecting apparatus 1, or other manufacturer(s) may be commissioned to manufacture the torque sensor 2.

Figure 6:
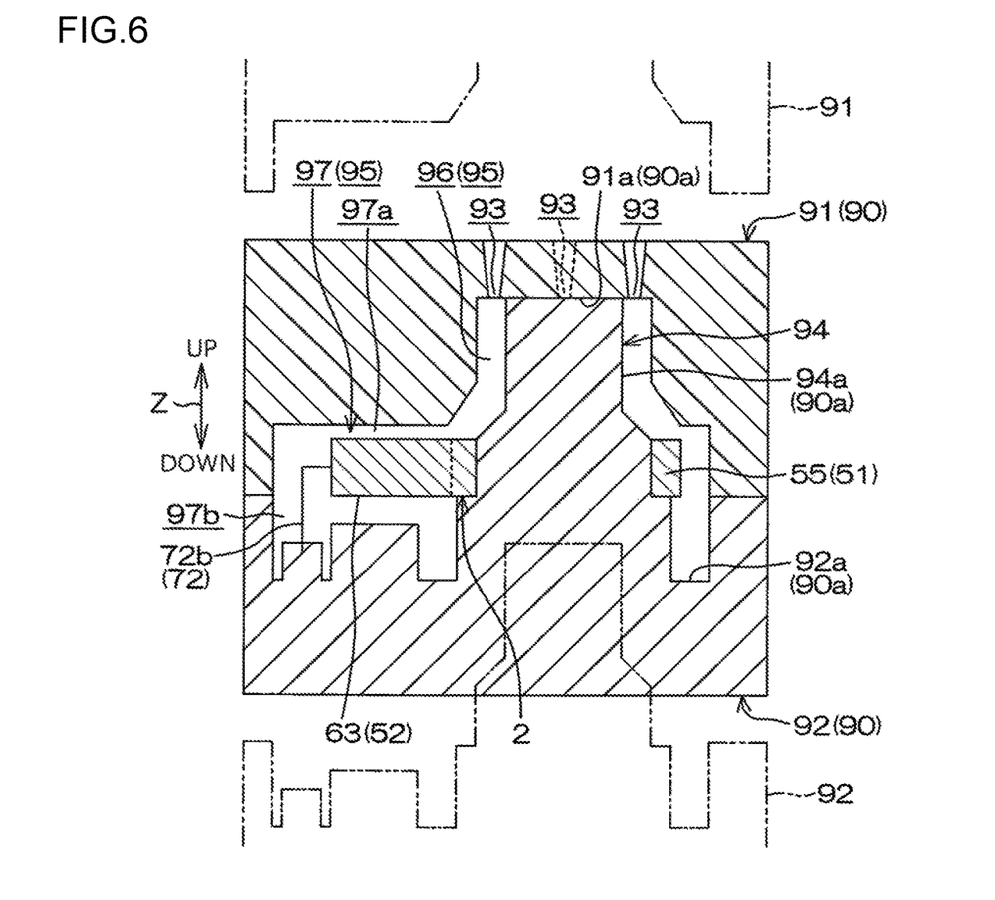
FIG. 6 is a schematic diagram illustrating a step included in a method for manufacturing the torque detecting apparatus.
Figure 7:
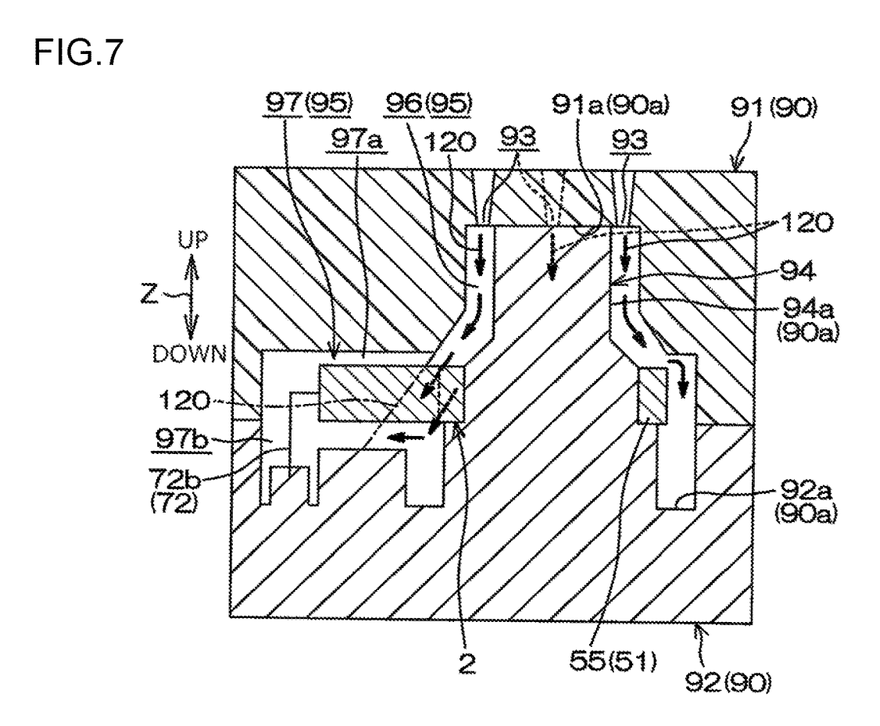
FIG. 7 is a schematic diagram illustrating a step included in the torque detecting apparatus manufacturing method and subsequent to the step illustrated in FIG. 6.
Figure 9:
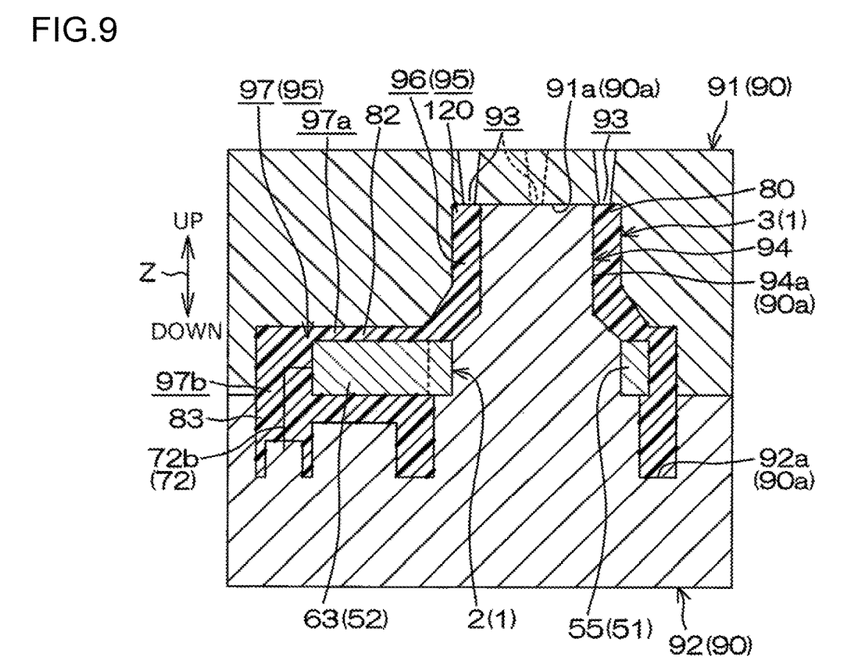
FIG. 9 is a schematic diagram illustrating a step included in the torque detecting apparatus manufacturing method and subsequent to the step illustrated in FIG. 7.

As illustrated in FIG. 6, an insert-molding mold 90 is prepared. The torque sensor 2 is placed in the mold 90. As with the torque sensor 2, the mold 90 that is a jig to be used for manufacture of the torque detecting apparatus 1 may be manufactured by the manufacturer of the torque detecting apparatus 1, or other manufacturer(s) may be commissioned to manufacture the mold 90. FIG. 6 is a schematic diagram illustrating a step included in the method for manufacturing the torque detecting apparatus 1. For convenience of description, illustration of the torque sensor 2 is simplified in FIG. 6. The same goes for FIGS. 7 and 9 described below. Specifically, illustration of the magnetic flux collecting rings 53 and the magnetic shield 57 of the first circuit portion 51, and illustration of the pair of first and second magnetic elements 61 and 62 and the electronic component 60 of the second circuit portion 52 are omitted in FIGS. 6, 7, and 9. In FIGS. 6, 7, and 9, the holder 63 and the magnetic flux collecting holder 55 are illustrated as if the holder 63 and the magnetic flux collecting holder 55 are a single member.

Referring to FIG. 6, the mold 90 includes an upper mold 91 and a lower mold 92 facing each other in an up-down direction Z. The lower surface of the upper mold 91 and the upper surface of the lower mold 92 face each other in the up-down direction Z. Bringing a portion of the lower surface of the upper mold 91 into contact with a portion of the upper surface of the lower mold 92 closes the mold 90. Separating the lower surface of the upper mold 91 and the upper surface of the lower mold 92 from each other opens the mold 90. The mold 90 includes an inner space 95 that is defined by the lower surface of the upper mold 91 and the upper surface of the lower mold 92, with the mold 90 closed. The lower surface of the upper mold 91 is provided with a first uneven portion 91a that defines an upper portion of the inner space 95. The upper surface of the lower mold 92 is provided with a second uneven portion 92a that defines a lower portion of the inner space 95.

The mold 90 further includes a columnar support 94 protruded upward from the upper surface of the lower mold 92. The support 94 is configured to support the first circuit portion 51 of the torque sensor 2. With the mold 90 closed, the support 94 is protruded toward the upper mold 91. With the mold 90 closed, a surface 94a of the support 94, the first uneven portion 91a, and the second uneven portion 92a provide an inner wall surface 90a of the mold 90. The inner space 95 is defined by the inner wall surface 90a.

The inner space 95 includes a first chamber 96 and a second chamber 97. With the torque sensor 2 placed in the mold 90, the first circuit portion 51 is disposed in the first chamber 96. With the torque sensor 2 placed in the mold 90, the second circuit portion 52 is disposed in the second chamber 97. The second chamber 97 is in communication with the first chamber 96. As used herein, the phrase "with the torque sensor 2 placed in the mold 90" refers to a state where the first circuit portion 51 of the torque sensor 2 is supported by the support 94, and the mold 90 is closed. The support 94 supports the first circuit portion 51 from below.

The mold 90 further includes gates 93. Resin is to be injected into the first chamber 96 through the gates 93. The gates 93 may be provided in an uppermost region of the first uneven portion 91a of the upper mold 91. In one example, the gates 93 are provided at a plurality of positions in such a manner that the gates 93 surround the periphery of the support 94. The gates 93 are in communication with the first chamber 96. The second chamber 97 includes a holder forming portion 97a and a connector forming portion 97b each having a substantially rectangular shape when viewed in a horizontal direction. The second circuit portion 52 is disposed in the holder forming portion 97a. The second portions 72b of the terminals 72 extending from the second circuit portion 52 are disposed in the connector forming portion 97b.

Alternatively, the upper mold 91 may include a convex portion (not illustrated) that abuts against the upper end of the support 94, and the gate(s) 93 may be provided in a region of the convex portion that abuts against the support 94. Subsequently, the method involves placing the torque sensor 2 in the mold 90. This step will be referred to as a "placing step". In FIG. 6, the upper and lower molds 91 and 92 of the mold 90 in an opened state are indicated by the long dashed double-short dashed lines.

The placing step involves placing the torque sensor 2 between the upper mold 91 and the lower mold 92, and then bringing the upper mold 91 and the lower mold 92 close to each other so as to close the mold 90. Thus, the torque sensor 2 is placed in the mold 90 such that the inner peripheral surface of the magnetic flux collecting holder 55 of the first circuit portion 51 is supported by the support 94. FIG. 7 is a schematic diagram illustrating a step subsequent to the placing step illustrated in FIG. 6. The subsequent step illustrated in FIG. 7 is a molding step involving injecting the resin 120 into the mold 90, and molding the housing 3, with the clearances S1 to S3 maintained. Specifically, as illustrated in FIG. 7, the molding step first involves a sub-step of injecting the resin 120 that is molten into the mold 90 having the torque sensor 2 placed therein. This sub-step will be referred to as an "injecting step". The resin 120 is injected into the first chamber 96 through the gates 93 (see the thick arrows in FIG. 7). The resin 120 injected into the first chamber 96 partially flows to the second circuit portion 52. Thus, the space between the mold 90 and the torque sensor 2 is filled with the resin 120. The resin 120 that is being injected into the mold 90 is illustrated in FIG. 7. Specifically, the resin 120 that is flowing into the second chamber 97 is also illustrated in FIG. 7. The resin 120 that has flowed into the second chamber 97 is indicated by the long dashed double-short dashed line.

Figure 8:
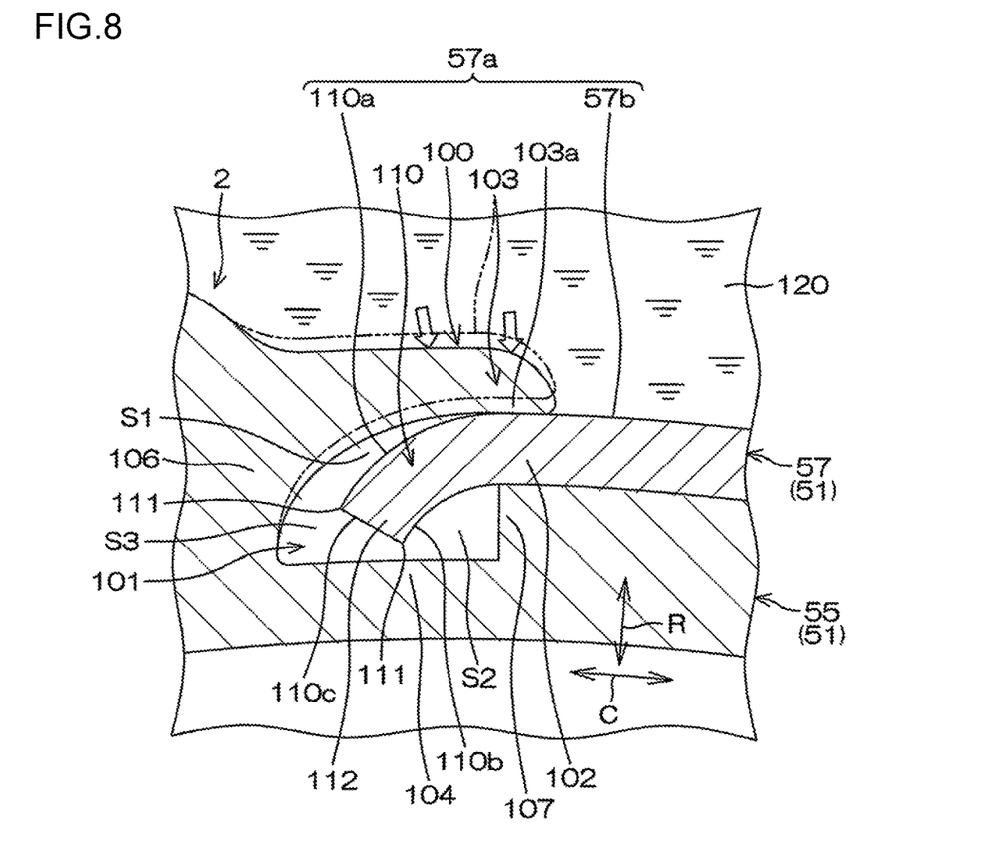
FIG. 8 is a schematic cross-sectional view of a magnetic shield and components adjacent thereto during an injecting step included in a molding step.

As illustrated in FIG. 8, during the molding step, pressure applied from the resin 120 inside the mold 90 presses the housing portion 100 against the outer peripheral surface 57a (or more specifically, the outer peripheral surface 57b) of the magnetic shield 57 at a location closer to the opening 102 of the housing portion 100 than to the associated circumferential end 110. Specifically, the outer wall 103 is elastically deformed such that a portion of the outer wall 103 of the housing portion 100 defining the opening 102 is brought into intimate contact with and pressed against the outer peripheral surface 57a of the magnetic shield 57 (see the hollow arrows in FIG. 8). This radially narrows the opening 102 so as to prevent entry of the resin 120 into the inner space 101 (or more specifically, the first clearance S1). The outer wall 103 is in contact with the outer peripheral surface 57b of the magnetic shield 57 before pressure applied from the resin 120 presses the outer wall 103 against the outer peripheral surface 57a (or more specifically, the outer peripheral surface 57b) of the magnetic shield 57 at a location closer to the opening 102 than to the associated circumferential end 110.

Referring to the long dashed double-short dashed line in FIG. 8, the outer wall 103 does not necessarily have to be in contact with the outer peripheral surface 57b of the magnetic shield 57 before being pressed against the outer peripheral surface 57b of the magnetic shield 57 by pressure applied from the resin 120. The outer wall 103 may be configured to be brought into contact with the outer peripheral surface 57b of the magnetic shield 57 by being pressed against the outer peripheral surface 57b by pressure applied from the resin 120.

Positioning of each housing portion 100 in the circumferential direction C is preferably effected such that the contact region 103a of the outer wall 103 of each housing portion 100 does not overlap with a weld line of the housing 3 (i.e., the gates 93 of the mold 90) when viewed in the axial direction X. FIG. 9 is a schematic diagram illustrating a step subsequent to the step illustrated in FIG. 7. As illustrated in FIG. 9, the molding step subsequently involves a sub-step of cooling the resin 120 through the mold 90, with the mold 90 filled with the resin 120, so as to solidify the resin 120. This sub-step will be referred to as a "cooling step". As a result of performing these steps, the housing 3 is integrally molded with the torque sensor 2.

Specifically, referring to FIG. 9, the body 80 of the housing 3 is molded by solidifying the resin 120 filled into the first chamber 96. The holder retainer 82 of the housing 3 is molded by solidifying the resin 120 filled into the holder forming portion 97a of the second chamber 97. The connector portion 83 of the housing 3 is molded by solidifying the resin 120 filled into the connector forming portion 97b of the second chamber 97. The method then involves opening the mold 90 in the up-down direction Z, and removing the housing 3 and the torque sensor 2 integral with each other from the mold 90. This step will be referred to as a "removing step". Performing the removing step completes the torque detecting apparatus 1 including the torque sensor 2 integral with the housing 3 housing the torque sensor 2.

When the torque detecting apparatus 1 to be used is installed on a vehicle, the magnetic shield 57, the magnetic flux collecting holder 55, and the housing 3 expand or contract owing to a change in temperature. The greater the distance from the central axis C1, the greater the degree of expansion or contraction of each member in the radial direction R caused by a change in temperature. Thus, if the circumferential end 110 of the magnetic shield 57 comes into contact with the magnetic flux collecting holder 55 and/or the housing 3, stress is likely to be concentrated, in particular, on region(s) of the magnetic flux collecting holder 55 and/or the housing 3 that come(s) into contact with the outer peripheral surface 110a of the circumferential end 110. This makes it likely that cracks will be formed in the region(s) of the magnetic flux collecting holder 55 and/or the housing 3.

In this embodiment, however, the magnetic flux collecting holder 55, surrounding and holding the annular magnetic flux collecting rings 53, includes the housing portions 100 that house the circumferential ends 110 of the magnetic shield 57. The first clearance S1 is provided between the outer wall 103 radially inwardly facing the outer peripheral surface 110a of the associated circumferential end 110 and the outer peripheral surface 110a of the associated circumferential end 110 of the magnetic shield 57. This makes it possible to prevent contact between the magnetic flux collecting holder 55 (including the housing portions 100 each located around the associated circumferential end 110 of the magnetic shield 57) and the outer peripheral surface 110a of each circumferential end 110 of the magnetic shield 57. Consequently, this embodiment prevents formation of cracks in the magnetic flux collecting holder 55 caused by contact of the circumferential end(s) 110 of the magnetic shield 57 with the magnetic flux collecting holder 55.

In this embodiment, the circumferential ends 110 of the magnetic shield 57 each include the corners 111. This prevents contact of the magnetic flux collecting holder 55 with the outer peripheral surface 110a of each circumferential end 110 of the magnetic shield 57 so as to more effectively prevent formation of cracks. This embodiment makes it unnecessary to provide cushioning materials to prevent stress concentration between the circumferential ends 110 of the magnetic shield 57 and the magnetic flux collecting holder 55 and/or between the circumferential ends 110 of the magnetic shield 57 and the housing 3. Thus, this embodiment prevents an increase in cost.

In this embodiment, the outer wall 103 of each housing portion 100 includes the contact region 103a in contact with the outer peripheral surface 57a (or more specifically, the outer peripheral surface 57b) of the magnetic shield 57 at a location closer to the opening 102 of the housing portion 100 than to the associated circumferential end 110. This makes it possible to prevent contact of the magnetic flux collecting holder 55 with the outer peripheral surface 110a of each circumferential end 110 of the magnetic shield 57, and to allow the magnetic flux collecting holder 55 to hold the magnetic shield 57 in a favorable manner.

The above-described magnetic flux collecting holder 55 having the magnetic shield 57 attached thereto is usable for insert molding. Suppose that the magnetic flux collecting holder 55 having the magnetic shield 57 attached thereto is placed in the mold 90, and the resin 120 is injected into the mold 90, so that the housing 3 is integrally molded with the magnetic flux collecting holder 55. In this case, each contact region 103a prevents entry of the resin 120 into the inner space of the associated housing portion 100 through the opening 102. This makes it possible to prevent contact of the housing 3, molded by insert molding, with the circumferential ends 110 of the magnetic shield 57. Consequently, this embodiment prevents formation of cracks in the housing 3 caused by contact of the circumferential ends 110 of the magnetic shield 57 with the housing 3.

In this embodiment, no resin 120 that forms the housing 3 is present between each outer wall 103 and the associated circumferential end 110 of the magnetic shield 57. This makes it possible to prevent contact of portions of the housing 3, located around the circumferential ends 110 of the magnetic shield 57, with the outer peripheral surfaces 110a of the circumferential ends 110 of the magnetic shield 57. In this embodiment, the circumferential ends 110 of the magnetic shield 57 each include the curved portion 112 curved radially inward. This makes it possible to successfully maintain the first clearance S1 between the outer peripheral surface 110a of each circumferential end 110 of the magnetic shield 57 and the outer wall 103 of the associated housing portion 100. In other words, this embodiment effectively prevents contact of each outer wall 103 with the associated circumferential end 110 of the magnetic shield 57.

In this embodiment, the second clearance S2 is provided between the inner peripheral surface 110b of each circumferential end 110 of the magnetic shield 57 and the inner wall 104 of the associated housing portion 100 radially outwardly facing the inner peripheral surface 110b of the circumferential end 110 of the magnetic shield 57. This makes it possible to prevent contact of the magnetic flux collecting holder 55 with the inner peripheral surface 110b of each circumferential end 110 of the magnetic shield 57. Consequently, this embodiment more effectively prevents formation of cracks in the magnetic flux collecting holder 55 caused by contact of the circumferential ends 110 of the magnetic shield 57 with the magnetic flux collecting holder 55.

In this embodiment, the third clearance S3 is provided between each circumferential end face 110c of the magnetic shield 57 and the bottom wall 106 of the associated housing portion 100 facing the circumferential end face 110c of the magnetic shield 57 in the circumferential direction C. This makes it possible to prevent contact of the magnetic flux collecting holder 55 with each circumferential end face 110c of the magnetic shield 57. Consequently, this embodiment more effectively prevents formation of cracks in the magnetic flux collecting holder 55 caused by contact of the circumferential ends 110 of the magnetic shield 57 with the magnetic flux collecting holder 55.

This embodiment prevents contact of the magnetic flux collecting holder 55 with the circumferential ends 110 of the magnetic shield 57. Thus, although the linear thermal expansion coefficient of the magnetic flux collecting holder 55 is greatly different from the linear thermal expansion coefficient of the magnetic shield 57, this embodiment more effectively prevents formation of cracks. In this embodiment, the magnetic flux collecting holder 55 having the magnetic shield 57 attached thereto is placed in the mold 90, and the resin 120 is injected into the mold 90 having the magnetic flux collecting holder 55 placed therein. Consequently, the housing 3 is formed integrally with the magnetic flux collecting holder 55. The molding step is carried out, with the first clearance S1 maintained between the outer wall 103 of each housing portion 100 of the magnetic flux collecting holder 55, radially inwardly facing the outer peripheral surface 110a of the associated circumferential end 110 of the magnetic shield 57, and the outer peripheral surface 110a of the associated circumferential end 110 of the magnetic shield 57. This makes it possible to prevent contact of portions of the magnetic flux collecting holder 55 and the housing 3 that are located around the circumferential ends 110 of the magnetic shield 57 with the circumferential ends 110 of the magnetic shield 57. Accordingly, this embodiment prevents formation of cracks in the magnetic flux collecting holder 55 and the housing 3 caused by contact of the circumferential ends 110 of the magnetic shield 57 with the magnetic flux collecting holder 55 and the housing 3.

In this embodiment, pressure applied from the resin 120 inside the mold 90 presses each outer wall 103 against the outer peripheral surface 57a (or more specifically, the outer peripheral surface 57b) of the magnetic shield 57 at a location closer to the opening 102 of the associated housing portion 100 than to the associated circumferential end 110. This makes it possible to prevent entry of the resin 120 into the inner space 101 while maintaining the first clearance S1. Consequently, this embodiment effectively prevents contact of the magnetic flux collecting holder 55 and the housing 3 with the circumferential ends 110 of the magnetic shield 57.

The invention is not limited to the embodiment described above, but various changes and modifications may be made within the scope of the claims.

In an alternative example, each housing portion 100 may be configured such that at least one of the second clearance S2 and the third clearance S3 is not provided. When no second clearance S2 is provided, each inner wall 104 does not have to be provided with the step 107.

Unlike this embodiment, the torque sensor 2 does not necessarily have to be attached to the second pinion shaft 8. In an alternative example, the torque sensor 2 may be attached to the steering shaft 11.

What is claimed is:
1. A torque detecting apparatus comprising:
an annular magnetic flux collecting ring;
a magnetic flux collecting holder surrounding and holding the magnetic flux collecting ring; and
a magnetic shield attached to an outer periphery of the magnetic flux collecting holder, the magnetic shield including a circumferential end, wherein
the magnetic flux collecting holder includes a housing portion housing the circumferential end of the magnetic shield, and
the housing portion includes an outer wall radially inwardly facing an outer peripheral surface of the circumferential end of the magnetic shield such that a clearance is provided between the housing portion and the outer peripheral surface of the circumferential end of the magnetic shield.
2. The apparatus according to claim 1, wherein
the housing portion further includes an opening provided at an end of the housing portion in a circumferential direction of the housing portion, and the outer wall includes a contact region in contact with an outer peripheral surface of the magnetic shield at a location closer to the opening than to the circumferential end.

3. The apparatus according to claim 1, further comprising a resin housing that houses the magnetic flux collecting holder, the housing being integral with the magnetic flux collecting holder, wherein no resin that forms the housing is present between the outer wall and the circumferential end of the magnetic shield.

4. The apparatus according to claim 1, wherein
the circumferential end of the magnetic shield includes a curved portion curved radially inward.

5. The apparatus according to claim 1, wherein
the housing portion further includes an inner wall radially outwardly facing an inner peripheral surface of the circumferential end of the magnetic shield such that a clearance is provided between the housing portion and the inner peripheral surface of the circumferential end of the magnetic shield.

6. The apparatus according to claim 1, wherein
the housing portion further includes a bottom wall circumferentially facing a circumferential end face of the magnetic shield such that a clearance is provided between the housing portion and the circumferential end face of the magnetic shield.

7. A method for manufacturing a torque detecting apparatus, the apparatus including an annular magnetic flux collecting ring, a magnetic flux collecting holder surrounding the magnetic flux collecting ring, a magnetic shield attached to an outer periphery of the magnetic flux collecting holder such that a circumferential end of the magnetic shield is housed in a housing portion of the magnetic flux collecting holder, and a housing that houses the magnetic flux collecting holder and is integral with the magnetic flux collecting holder, the method comprising:

placing the magnetic flux collecting holder having the magnetic shield attached thereto in a mold such that a clearance is provided between an outer peripheral surface of the circumferential end of the magnetic shield and an outer wall of the housing portion radially inwardly facing the outer peripheral surface of the circumferential end of the magnetic shield; and molding the housing by injecting resin into the mold having the magnetic flux collecting holder placed therein, with the clearance maintained.

8. The method according to claim 7, wherein
during the molding, pressure applied from the resin inside the mold presses the outer wall against an outer peripheral surface of the magnetic shield at a location closer to an opening of the housing portion than to the circumferential end.

* * * * *